United States Patent [19]
Tsunekawa et al.

[11] 4,156,564
[45] May 29, 1979

[54] PHOTOMETRIC DEVICE

[75] Inventors: Tokuichi Tsunekawa, Yokohama; Tetsuya Taguchi, Kawasaki; Fumio Ito, Yokohama; Isao Harigaya, Yokohama, all of Japan

[73] Assignee: Canon Kabushiki Kaisha, Tokyo, Japan

[21] Appl. No.: 906,913

[22] Filed: May 17, 1978

[30] Foreign Application Priority Data

May 25, 1977 [JP] Japan ................................. 52-60903
May 25, 1977 [JP] Japan ................................. 52-60904

[51] Int. Cl.$^2$ ............................................. G03B 7/08
[52] U.S. Cl. ........................................ 354/59; 354/49; 354/60 L
[58] Field of Search .................. 354/23 R, 42, 49, 59, 354/60 R, 60 L

[56] References Cited

U.S. PATENT DOCUMENTS 3,860,936  1/1975  Harvey ........................ 354/60 L X
4,065,777  12/1977  Maitani et al. .................... 354/59 X Primary Examiner—Michael L. Gellner
Attorney, Agent, or Firm—Toren, McGeady and Stanger

[57] ABSTRACT

A filter for compensation of spectral sensitivity is provided in front of a light receiving element through a light shielding tube. A light source emitting such light as having wave length characteristics which fall within a sensitive wave length zone of the light receiving element yet fall outside of transmitting wave length zone of the filter is provided between the filter and the light receiving element. Light from outside irradiates the light receiving element through the filter while light from the light source is so controlled as irradiating the light receiving element but not leaking through the filter to outside, so that the light from the light source can irradiate the light receiving element without any relationship with the irradiation of outside light on the light receiving element.

7 Claims, 8 Drawing Figures

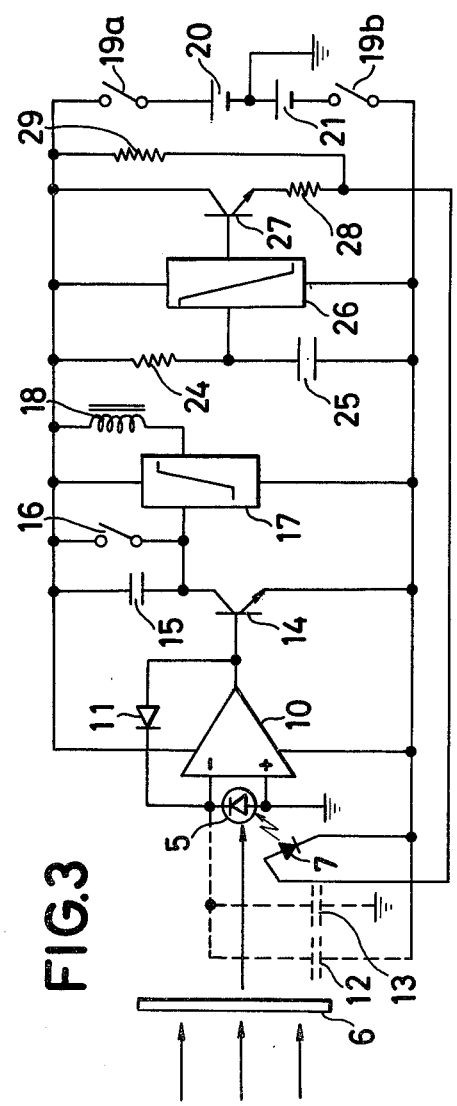
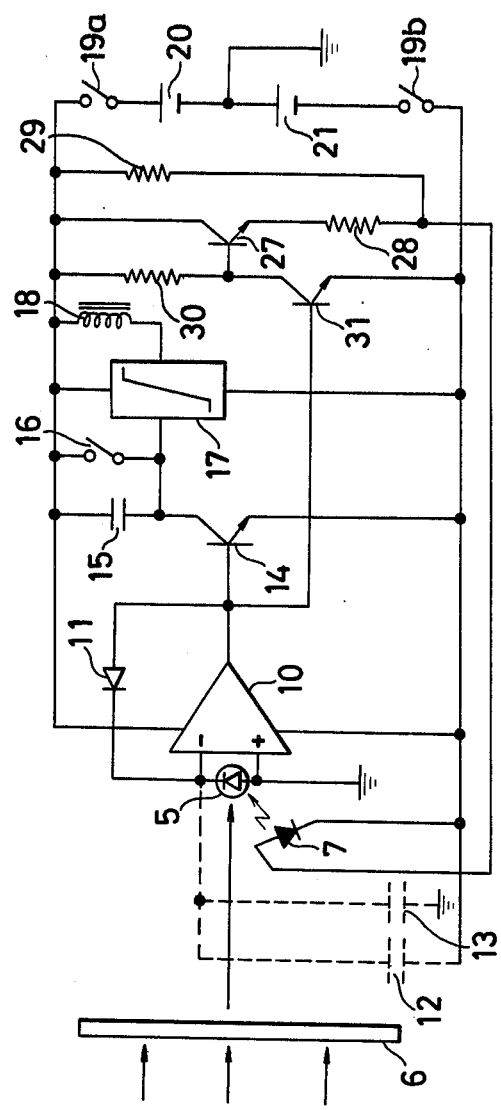
FIG.3
FIG.4

PHOTOMETRIC DEVICE

BACKGROUND OF THE INVENTION

1. Field of the Invention

The present invention relates to a photometric device in which responsive characteristics of a light receiving element is improved, and particularly to an improvement of responsive characteristics of a photometric device suited for a camera.

2. Description of the Prior Art

Generally speaking, light from an object has a wide range of wave length zone and spectral sensitivity of such light receiving element as a silicon photo-diode, etc. has such characteristics as shown by $E_1$ in FIG. 1. But a wave length zone which can actually be visually sensible by a naked eye is 400 m$\mu$ to 700 m$\mu$. Therefore if light from an object, as it is, is sensed, light in infrared zone greatly affect the sensing thus an appropriate exposure cannot be obtained.

Therefore, a filter for compensation of spectral sensitivity is provided in front of a light receiving element to eliminate the effect of the infrared light on the light receiving element so that a compensation is made to such spectral characteristic as close to a relative luminosity in a conventional method.

However, in a conventional photometric circuit in which a photo-electric conversion element of a photo-voltaic type is used as a light receiving element, an operational amplifier with high input impedance having at its input stage a field effect transistor, FET, is connected to said light receiving element, therefore, unnecessary charging is instantaneously made to such stray capacitance as a capacitance existing at the field effect transistor FEI as a light source is put in, a junction capacitance of said light receiving element, and a capacitance generated at a printed circuit network, etc., and a considerable length of time is required to discharge said unnecessary charge, thus a photometric circuit is difficult to be stabilized. This stands out particularly as an amount of photo-current is small when a photometry is made for a weak light beam.

Further, since photo-current to a logarithmic conversion diode inserted in a negative feedback circuit is cut off in a black out state in a conventional photometric circuit, negative feedback will not work on an operational amplifier with high input impedance, and an output of said amplifier will have either a high level or a low level depending on a direction of the diode. That is, the amplifier is latched. Therefore, it takes time to release said latching on the operational amplifier at a time of next photo-taking, thus follow-up characteristics of a photometric circuit to an amount of incident light becomes poor.

An object of the present invention is to eliminate said shortcomings, and is to provide a light source emitting light with a prescribed wave length zone between a light receiving element and a filter for compensation of spectral sensitivity which is positioned in front of said light receiving element, so that responsive characteristics of the light receiving element and responsive characteristics of the photometric circuit are improved.

Another object of the present invention is to control light emission of a light source provided between a light receiving element and a compensation filter.

BRIEF DESCRIPTION OF THE DRAWINGS

FIG. 3 is a circuit diagram to show a first example of an exposure control circuit of a camera using the photometric device shown in FIG. 2.

FIG. 4 is a circuit diagram to show a second example of an exposure control circuit of a camera using the photometric device shown in FIG. 2.

DESCRIPTION OF PREFERRED EMBODIMENTS

Figure 1:
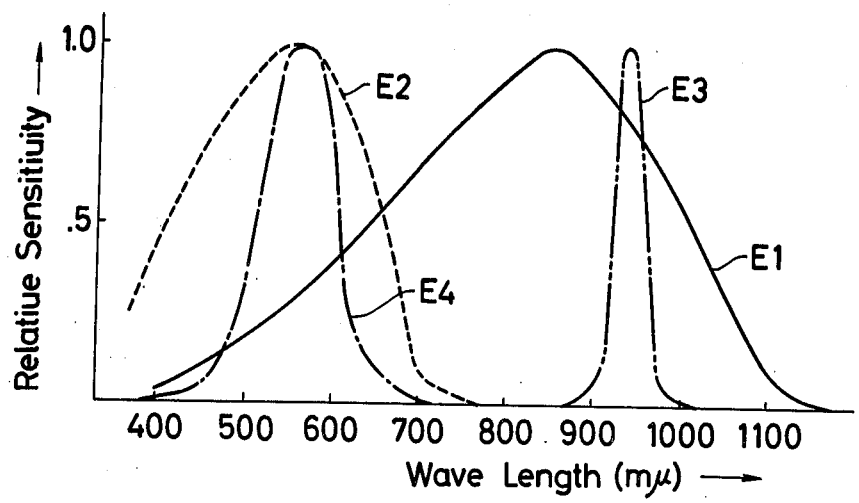
FIG. 1 is a spectral characteristics diagram for a light receiving element, a filter and an additional light source used in the present invention.

Now, explanations will be made on an example of the present invention referring to the drawings.

FIG. 1 is to show spectral characteristics of a light receiving element, a filter for compensation of spectral sensitivity and a light source, in which $E_1$ shows spectral sensitivity characteristics when a silicon photo-diode of a photo-voltaic type is used as a light receiving element, and $E_2$ shows spectral transmission characteristics of a filter for compensation of spectral sensitivity, while $E_3$ shows spectral energy distribution characteristics when a light emitting diode is used as an infrared light source, and $E_4$ shows spectral sensitivity characteristics necessary as a light receiving element for a camera, wherein when the spectral characteristics $E_1$ and the spectral characteristics $E_2$ are combined, the spectral sensitivity characteristics of the silicon photo-diode as a whole will become something like $E_4$, thus such spectral characteristics as appropriate for a light receiving element for a camera can be obtained. On the other hand, the spectral energy distribution characteristics $E_3$ will be within a zone of the spectral characteristics $E_1$ but will not be within a zone of the spectral characteristics $E_2$.

Figure 2:
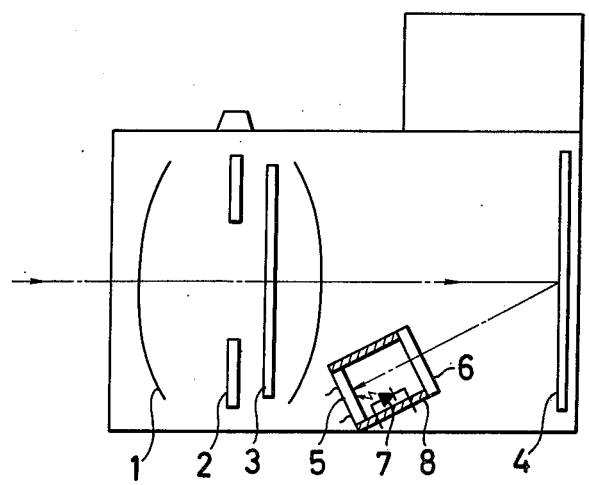
FIG. 2 is a diagram to show a photometric device of the present invention as it is positioned within a lens shutter camera.
Figure 8:
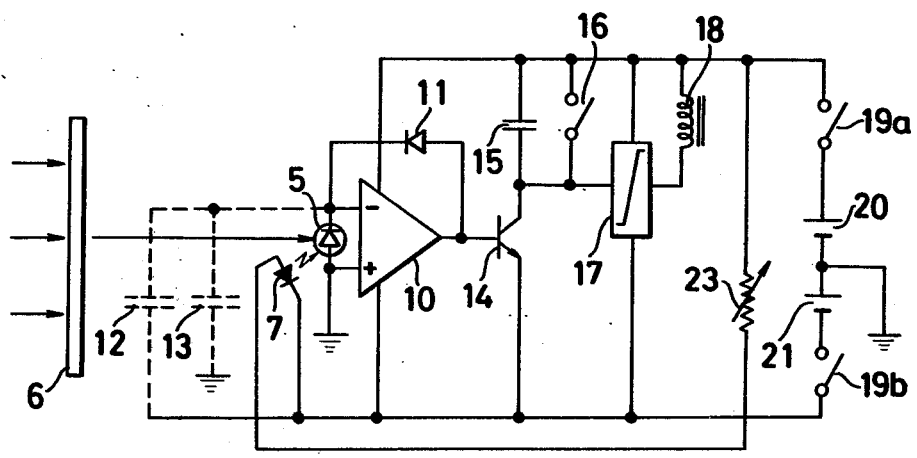
FIG. 8 is a circuit diagram to show a fifth example of an exposure control circuit of a camera using a photometric device according to the present invention.

Next, FIG. 2 is to show a photometric device of a camera utilizing the set up of the spectral characteristics shown in FIG. 1, wherein what is shown as 1 is a photo-taking lens, 2 is a diaphragm, 3 is a lens shutter, 4 is a film, 5 is a silicon photo-diode as a light receiving element having the spectral sensitivity characteristics shown by $E_1$ in FIG. 1, 6 is a filter for compensation of spectral sensitivity having the spectral transmission characteristics shown by $E_2$ in FIG. 1, 7 is a light emitting diode as a light source having the spectral energy distribution shown by $E_3$ in FIG. 1, and 8 is a light shielding tube to limit incident light beams into the silicon photo-diode 5, wherein the filter 6 is provided at a front plane of said light shielding tube 8 and the light emitting diode 7 is provided within the light shielding tube 8.

FIG. 3 shows an example of an exposure control circuit of a camera using a photometric device shown in FIG. 2, wherein same components as those shown in FIG. 2 are identified with same numbers.

What is shown as 10 is an operational amplifier with high input impedance having the silicon photo-diode 5 connected between its input terminals. What is shown as 11 is a logarithmic conversion element to logarithmically compress a photo-current of the silicon photo-diode 5. What are shown as 12 and 13 show various stray capacitance existing at an inverting input terminal of the operational amplifier 10 (for example, a capacitance of a field effect transistor at an input stage of the operational amplifier 10, a junction capacitance of the photo-diode 5, a capacitance at a time when the circuit is actually built in a camera, etc.). What is shown as 14 is a logarithmic expansion transistor connected to an output terminal of the operational amplifier. What is shown as 15 is a shutter time integration capacitor connected to said transistor. What is shown as 16 is a count switch. What is shown as 17 is a Schmidt trigger circuit to detect a level of voltage between terminals of said capacitor 15. What is shown as 18 is a shutter control magnet which has its conductance controlled when it is detected that the Schmidt trigger circuit 17 reaches a prescribed level. What are shown as 19a, 19b are main switches closed by a pressing down of a shutter button. What are shown as 20, 21 are power source batteries, while 24, 25 are a resistance and a capacitor forming a time constant circuit. What is shown as 26 is a Schmidt trigger circuit to detect a voltage level between terminals of the capacitor 25. What is shown as 27 is a switching transistor, which is placed in a non-conductive state when it is detected that the Schmidt trigger circuit 26 reaches a prescribed level to reduce an amount of light emitted by the light emitting diode 7. What are shown as 28 and 29 are bias resistances, in which the bias resistance 28 has a resistance value being sufficiently smaller than that of the resistance 29.

Then, explanations will be made on a function of the above mentioned set up.

When the main switches 19a, 19b are made ON by a pressing down of a shutter button, the above mentioned unnecessary charging is made to the stray capacitances 12, 13 such as a capacitance of the field effect transistor, etc. at the input stage of the operational amplifier through the logarithmic conversion element 11, etc., while a photometric circuit system is in a transition period. But, since the voltage charged at the capacitor 25 does not reach a prescribed value at this time thus the output of the Schmidt trigger circuit is at a high level and the switching transistor 27 is an ON state, a large amount of bias current flows to the light emitting diode 7 through the bias resistance 28 to generate bright light. By this, a large amount of photo-current flows to the silicon photo-diode 5 and the unnecessary charge at the stray capacitances 12, 13 is instantaneously discharged, thus the output of the operational amplifier 10 rapidly recovers a normal operating voltage. The Schmidt trigger circuit 26 is inversed after a lapse of time determined by the resistance 24 and the capacitor 25 and comes to have a low level to place the switching transistor 27 in OFF state. Therefore a small amount of bias current which flows through the bias resistance 29 flows to the light emitting diode 7. At a same time, as a shutter button is further pressed down the shutter 3 is released. By this, an object light is reflected at a plane of the film 4 through the photo-taking lens 1 and thus reflected light reaches the silicon photo-diode 5 through the filter 6 for compensation of spectral sensitivity characteristics. Therefore the spectral sensitivity characteristics of the silicon photo-diode 5 against an object light will become an appropriate one suitable for an exposure meter of a camera as shown by $E_4$ in FIG. 1. Also the light from the light emitting diode 7 irradiates the silicon photodiode 5 but does not irradiate a surface of the film 4 as the filter 6 intervenes, thus there will be no effect on the film 4. Therefore, when the count switch 16 becomes OFF at a same time the shutter 3 is released, the capacitor 15 is charged corresponding to the output of the operational amplifier 10, then as the capacitor 15 reaches to have a prescribed value after a lapse of some time the Schmidt trigger circuit 17 is inversed and the magnet 18 is placed in non-magnetized state, thus the shutter 3 is closed. Even if an object is placed in a black out state during an exposure a certain level of bias current is supplied to the photometric circuit by the light emitting diode 7, thus the photometric circuit will not be latched and will retain a high speed responsive characteristics.

FIG. 4 is to show a second example of an exposure control circuit, wherein an amount of current supplied to the light emitting diode 5 is controlled through a switching transistor 31 controlled by an output of an operational amplifier 10 with high input impedance, for improving transient responsive characteristics of the photometric circuit, wherein same components as those in FIG. 3 are identified with same numbers and explanations therefor will be omitted. What is shown as 31 is a switching transistor having ON-OFF control effected thereon by the output of the operational amplifier 10, and the transistor 27 can be controlled by said transistor 31. What is shown as 30 is a bias resistance.

And when the main switches 19a and 19b are made ON by a pressing down of a shutter button, the above mentioned unnecessary charging to the stray capacitances such as a capacitance of the field effect transistor at the input state of the operational amplifier 10 will be made. In this case since the output of the operational amplifier 10 reaches a saturation level at a lower side, the switching transistor 31 becomes OFF and the transistor 27 becomes ON. Therefore a large amount of bias current flows to the light emitting diode 7 through the resistance 28 and the light emitting diode 7 emits bright light. By this, a large amount of photo-current flows to the silicon photo-diode 5 and the unnecessary charge at the stray capacitances 12, 13 is instantaneously discharged and the output potential of the operational amplifier 10 becomes high thus a normal operating potential is rapidly resumed. Therefore the transistor 31 becomes ON while the transistor 27 becomes OFF, thus a small amount of bias current which flows through the bias resistance 29 flows to the light emitting diode 7. Operations thereafter will be made in a manner similar to that in the first example.

Figure 5:
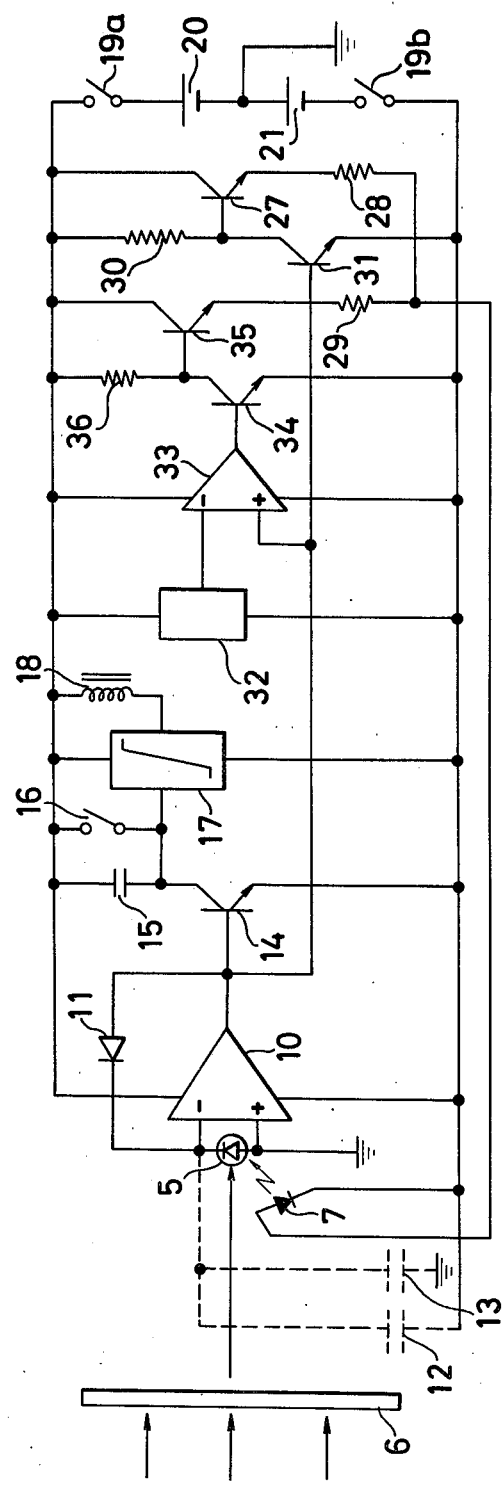
FIG. 5 is a circuit diagram for a third example of an exposure control circuit of a camera using the photometric device shown in FIG. 2.

FIG. 5 is to show a third example of an exposure control circuit, wherein bias current is supplied to a light emitting light source 7 for preventing a latching of an operational amplifier 10 only when an object brightness is at a prescribed value or below, and same components as those in FIG. 4 are identified with same numbers and explanations therefor will be omitted. What is shown as 32 is a constant voltage circuit, and 33 is a comparator to have the output of the constant voltage circuit 32 added to one of its inputs while the output of the operational amplifier 10 is added to the other input thereof. What are shown as 34 and 35 are transistors while 36 is a bias resistance.

When the main switches 19a and 19b are made ON by a pressing down of a shutter button, the above mentioned unnecessary charging to such stray capacitances as a capacitance of the field effect transistor at the input stage of the operational amplifier 10 will be made. In this case, since the output of the operational amplifier 10 reaches a saturation level at a lower side, the transistor 31 becomes OFF while the transistor 27 becomes ON. Therefore, a large amount of bias current flows to the light emitting diode 7 through the resistance 28, and the light emitting diode 7 emits bright light. By this a large amount of photocurrent flows to the silicon photo-diode 5 and the unnecessary charge at the stray capacitances 12, 13 is instantaneously discharged and the output potential of the operational amplifier 10 becomes high, thus a normal operating potential is rapidly resumed. Therefore, the transistor 31 becomes ON while the transistor 27 becomes OFF, thus a small amount of bias current which passes through the bias resistance 29 can flow to the light emitting diode 7. When the output voltage of the operational amplifier 10 reaches a normal operational potential, the shutter 3 is released by further pressing down of a shutter button, then the light receiving element 5 receives an object light and such output as corresponding to a level of an object brightness is generated at the operational amplifier.

Said output of the operational amplifier 10 is compared with the output of the constant voltage circuit 32 by the comparator 33, and when the output of the operational amplifier 10 becomes smaller than the output of the constant voltage circuit 32, the output of the comparator 33 becomes to have a low level to place the transistor 34 in OFF state and the transistor 35 in ON state, therefore, a small amount of bias current for prevention of latching is supplied to the light emitting diode 7 through the resistance 29. Therefore, when the output of the operational amplifier 10 is larger than the output of the constant voltage circuit 32, the output of the comparator 33 is inversed to a high level to place the transistor 34 in ON state and the transistor 35 in OFF state, thus bias current will not be supplied to the light emitting diode 7 and no light is emitted. Operations thereafter will be same as those in the first example.

Figure 6:
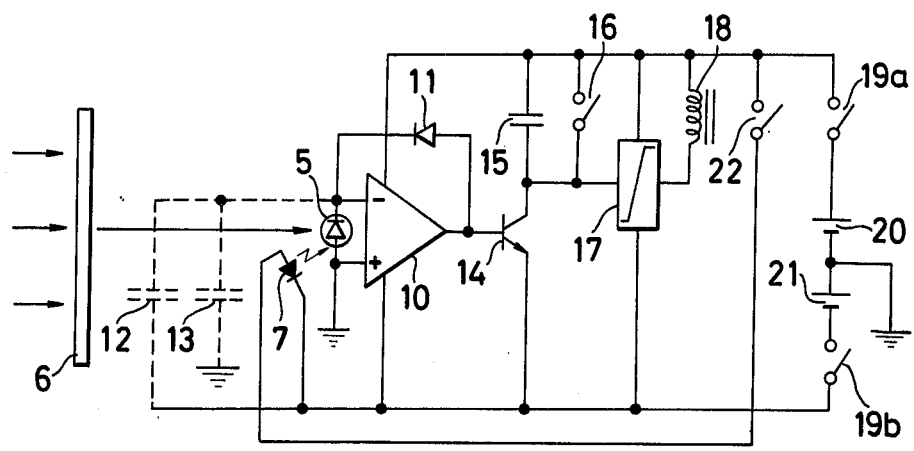
FIG. 6 is a circuit diagram for a fourth example of an exposure control circuit of a camera using the photometric device shown in FIG. 2.

FIG. 6 is to show a fourth example of an exposure control circuit, wherein same components as those in FIG. 5 will be identified with same numbers and explanations therefor will be omitted.

What is shown as 22 is a switch which momentarily becomes ON in an association with a second step pressing down of a shutter button, and said switch 22 has the light emitting diode 7 connected in series thereto, wherein the light emitting diode 7 is momentarily lighted as the switch 22 becomes momentarily ON.

Next, explanations will be made on a function of the above mentioned set up.

When the main switch 19 becomes ON by a first step pressing down of a shutter button, the above mentioned unnecessary charging to such stray capacitances 12, 13 as a capacitance of a field effect transistor at an input stage of the operational amplifier, etc. is made through the logarithmic conversion element 11, etc. at a transient state of the photometric circuit system. And as the switch 22 becomes momentarily ON in an association with a second step pressing down of a shutter button, the light emitting diode 7 momentarily emits light to irradiate the silicon photo-diode 5, and the unnecessary charge at the stray capacitances is instantaneously discharged by the photo-current of the silicon photo-diode 5 and is eliminated, thus the photometric circuit is stabilized. At a same time therewith the shutter 3 is released, then an object light is reflected at a plane of the film 4 through the photo-taking lens 1, and thus reflected light reaches the silicon photo-diode 5 through the filter 6 for compensation of spectral sensitivity characteristics. By this, the spectral sensitivity characteristics of the silicon photo-diode 5 against an object light will become an appropriate one as an exposure meter of a camera as shown by $E_4$ in FIG. 1. Also, the light from the light emitting diode 7 irradiates the silicon photo-diode 5 but does not irradiates the surface of the film 4 as the filter 6 intervenes, thus the film 4 will not be affected.

Therefore, when the count switch 16 becomes OFF at a same time with a release of the shutter 3, the capacitor 15 is charged corresponding to the output of the operational amplifier 10, and as the capacitor 15 reaches a prescribed value after a lapse of some time, the Schmidt trigger circuit 17 is inversed and the magnet 18 is placed in non-magnetized state, thus the shutter 3 is closed.

Figure 7:
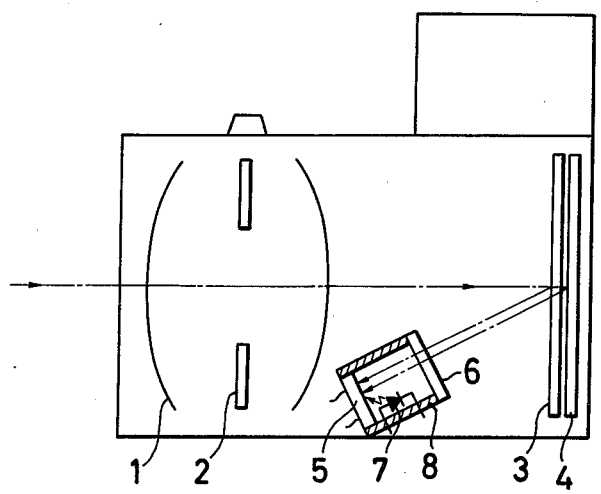
FIG. 7 is a diagram to show a photometric device of the present invention as it is positioned within a focal plane shutter camera.

While the above explanations have been made on a case when a lens shutter is used in each example for exposure control circuits, a circuit in each example can be used not only in a camera with a lens shutter but also in a camera using a focal plane shutter 3' as shown in FIG. 7. In this case, the light reflected from a surface of the shutter 3' and a surface of the film 4 irradiates the light receiving element 5 through the filter 6, wherein such set up may be employed that the light emitting diode 7 closes the switch 22 together with the main switch 19 being closed by a first step action of the shutter button.

Also, the photometric device in the present invention is not only to instantaneously eliminate the unnecessary charge to the stray capacitances, but also to be used as a limitter of a shutter time when a variable resistance 23 shown in FIG. 8 is used in place of the switch 22 shown in FIG. 6 and said variable resistance 23 is regulated to keep the brightness of the light emitting diode 7 at a prescribed value.

That is, when the variable resistance 23 is so set that a brightness of the light emitting diode 7 will be such as making a shutter time for example 1/60 second, a shutter time control corresponding to an object brightness is done when said brightness is brighter than said set value while a shutter is controlled at 1/60 second when an object brightness is darker than said set value. If said set value is maintained at a limit level for hand shaking, it serves to prevent a hand shaking, wherein since said hand shaking limit value is different depending on a kind of lens (wide angle, standard, telescope), when the variable resistance 23 for regulating an amount of light of the light emitting diode 7 is automatically or manually adjusted according to a kind of lens, a hand shaking can be prevented in any case.

As have been explained above, in the present invention, a filter for compensation of spectral sensitivity is provided in front of a light receiving element and a light emitting light source for supplying bias light having such spectral illuminant energy characteristics as falling within a sensitive wave length zone of the light receiving element yet falling outside of a transmitting wave length zone of the filter is positioned between the filter and the light receiving element, thereby constituting such photometric device that the light from outside irradiates the light receiving element through the filter while the light from said light source irradiates the light receiving light but does not leak to outside of the filter, then by using this light receiving device at a camera the unnecessary charge at the stray capacitances generated at the photometric circuit can be instantaneously eliminated without giving any bad effect on a photo-sensitive material as a film, etc., and at a same time such photometric device can be provided as being able to prevent a latching of the operational amplifier during a photometric period and being able to be used as a limitter for a shutter time.

Furthermore, a photometric device according to the present invention can be used not only for a camera but also for a photo-electric switch such as a photo-coupler, etc. and for an illuminometer, and in a latter case since a weak light can irradiate a light receiving element beforehand by an additional light source before the light from outside irradiates the light receiving element, therefore the responsive characteristics of the light receiving element can be maintained always at the best state, thus providing a photo-electric switch or an illuminometer with high degree of accuracy.

As has been mentioned above, a photometric device according to the present invention can be used not only at a camera but naturally at various other applications without falling outside of the purport of the present invention.

What is claimed is:

1. A photometric device, comprising:
    a light receiving element,
    a light shielding tube provided in front of said light receiving element, wherein said tube has external light from a prescribed direction incident in the light receiving element,
    a filter provided at a front plane of said light shielding tube, wherein said filter transmits external light within a prescribed wave length zone, and
    a light emission means positioned within said light shielding tube, wherein said means generates light having such wave length characteristics as falling within a sensitive wave length zone of said light receiving element yet falling outside of a transmitting wave length zone of the filter,
    whereby the light from the light emitting means irradiates the light receiving element but does not leak to outside of the filter, and the light from the light emitting means is made irradiatable the light receiving element without any relationship with the external light irradiating the light receiving element.

2. A photometric device according to claim 1, in which said external light is the light transmitting a phototaking lens being reflected by at least one of a shutter plane or a film plane.

3. A photometric device for a camera, comprising:
    a light receiving element,
    a photometric means, which has an operational amplifier for photometry and has said light receiving element connected to between input terminals of said operational amplifier,
    a light shielding tube provided in front of said light receiving element, wherein said tube has an object light from a prescribed direction incident into the light receiving element,
    a filter which is provided at a front plane of said light shielding tube and transmits an object light in a prescribed wave length zone,
    a light emission means which is positioned within said light shielding tube and emits light having such wave length characteristics as falling within a sensitive wave length zone of the light receiving element yet falling outside of a transmitting wave length zone of the filter, and
    a light emission control means which causes said light emission means to emit light and is placed in an operative state by an output of said operational amplifier at an initial stage of photometry,
    whereby the light from said light emission means does not leak to outside of the filter and irradiates the light receiving element, thus instantaneously eliminating an unnecessary charge to stray capacitances existing at the input terminal of said operational amplifier.

4. A device according to claim 3, in which said light emission control means has a switching element, which is controlled by an output of the operational amplifier to place said light emission control means in an operative state.

5. A device according to claim 4, in which said light emission control means has a time constant circuit and said switching element is placed in an operative state only for a prescribed length of time by said time constant circuit.

6. A device according to claim 3, in which said light emission means is a light-emitting diode, and said light emission control means is a bias current supply circuit.

7. A device according to claim 6, in which said bias current supply circuit has a first circuit to supply a large amount of bias current to the light-emitting diode at an initial stage of photometry and a second circuit to supply a small amount of bias current to the light-emitting diode during a photometry period.

* * * * *